United States Patent [19]

Sakuma

[11] Patent Number: 5,243,898
[45] Date of Patent: Sep. 14, 1993

[54] PRESSURIZED FRYER DEVICE

[76] Inventor: Ken Sakuma, 793, Hachigasaki, Matsudo-shi, Chiba, Japan

[21] Appl. No.: 754,874

[22] Filed: Sep. 4, 1991

[30] Foreign Application Priority Data

Jan. 21, 1991 [JP] Japan .................. 3-019183

[51] Int. Cl.$^5$ ............................................. A47J 37/12
[52] U.S. Cl. ........................................ 99/408; 99/407; 99/330; 426/438
[58] Field of Search .................. 99/407, 408, 330, 336, 99/342, 331, 404; 426/438; 126/374, 351

[56] References Cited

U.S. PATENT DOCUMENTS

| | | | |
|---|---|---|---|
| 4,084,492 | 4/1978 | Sullivan | 99/407 |
| 4,721,625 | 1/1988 | Lee et al. | 426/438 |
| 4,732,081 | 3/1988 | Sakuma | 99/407 |
| 4,768,426 | 9/1988 | Nett | 99/408 |
| 4,882,984 | 11/1989 | Eves, II | 99/404 |
| 4,890,548 | 1/1990 | Grob et al. | 99/408 |
| 4,962,698 | 10/1990 | Drijftholt et al. | 99/408 |

FOREIGN PATENT DOCUMENTS 54-25109 8/1979 Japan .

Primary Examiner—Stephen F. Gerrity
Assistant Examiner—Patrick F. Brinson
Attorney, Agent, or Firm—Armstrong, Westerman, Hattori, McLeland & Naughton

[57] ABSTRACT

A pressurized fryer device adapted to continuously carry out the steps of feeding oil of a predetermined temperature from an oil heater into a pressurized fryer chamber, placing a material to be treated into the oil, frying the material under pressure for a predetermined time, taking out the fried material, returning used oil through a filter to an oil heater, and feeding the oil heated to a predetermined temperature in a preliminary tank into the above pressurized frying chamber, and frying the material under pressure for a predetermined time.

1 Claim, 7 Drawing Sheets

PRESSURIZED FRYER DEVICE

BACKGROUND OF THE INVENTION

1. Field of the Invention

The present invention relates to a pressurized fryer device for food, particularly meat and fish.

2. Description of the Related Art

Among known pressure fryer devices for food is a pressurized fryer device disclosed in Japanese Patent No. 999431 (Japanese Patent Publication (Kokoku) No. 54-25109) and developed by the Applicant of the present application. This pressurized fryer device, however, has a complicated structure and starting materials cannot be placed in or removed from the oil therein under atmospheric pressure, the device is too large, and further, a change in the pressure of the pressurized fryer device according to the fryer program is difficult, and therefore, a change in the oil temperature and a change in the frying time is also difficult, and thus the device has proved to be unsuitable for the production of a large amount of uniform products.

SUMMARY OF THE INVENTION

Accordingly, the objects of the present invention are to eliminate the above-mentioned disadvantages of the prior art and to provide a pressurized fryer device capable of frying a large amount of uniformly fried products.

Other objects and advantages of the present invention will be apparent from the following description.

In accordance with the present invention, there is provided a pressurized fryer device able to continuously carry out the steps of feeding oil of a predetermined temperature from an oil heater into a pressurized fryer chamber, placing a material to be treated in the oil, frying the material under pressure for a predetermined time, taking out the fried material, returning used oil through a filter to an oil heater, and feeding the oil heated to a predetermined temperature in a preliminary tank into the above pressurized frying chamber, and frying the material under pressure for a predetermined time.

BRIEF DESCRIPTION OF THE DRAWINGS

The present invention will be better understood from the description set forth below with reference to the accompanying drawings, in which.

DESCRIPTION OF THE PREFERRED EMBODIMENT

Figure 1:
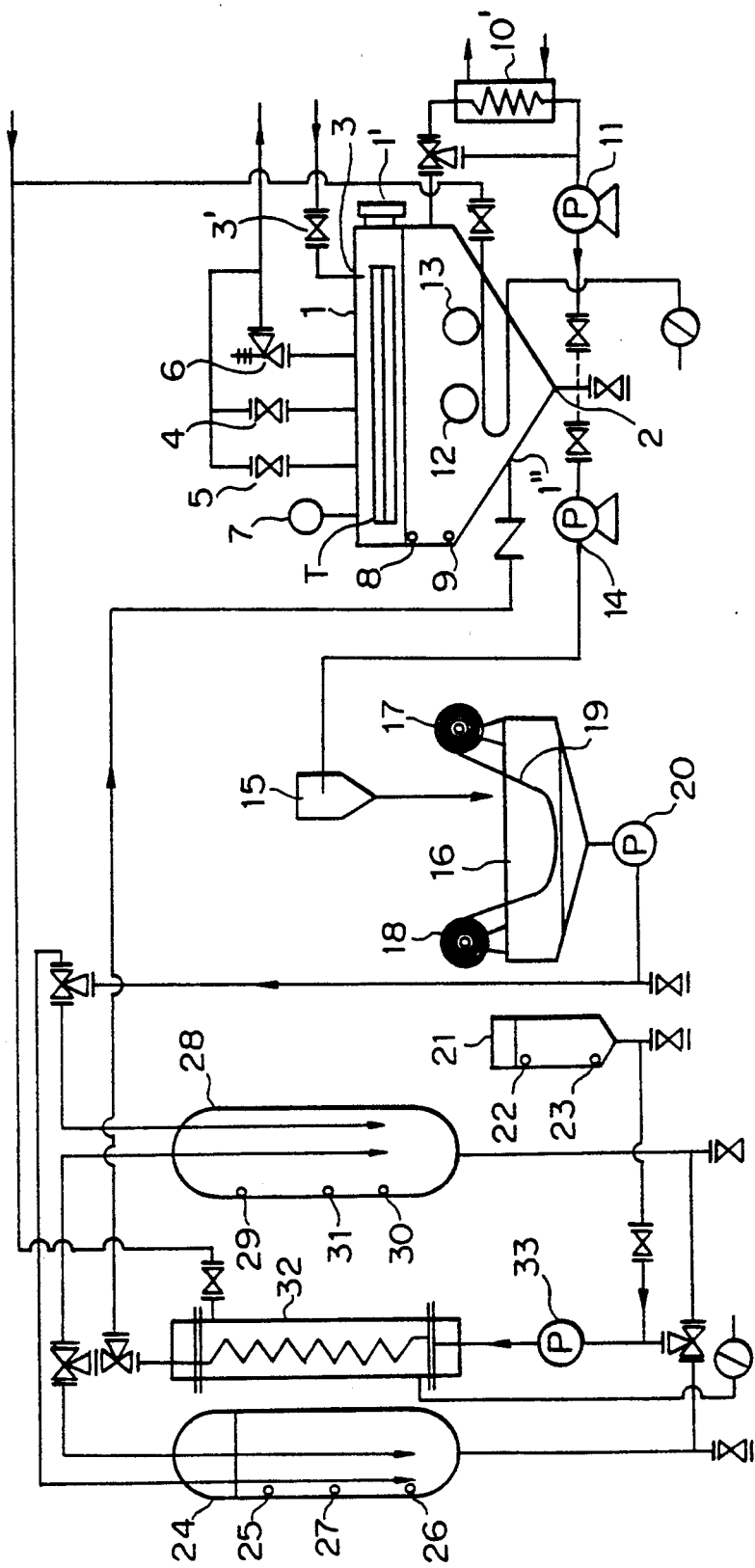
FIG. 1 is a side view of an example of the present invention.

Research and development has been made in order to eliminate the drawbacks of the prior art and improve the quality of the products under the required oil temperature and pressure, and to cook the starting materials to be treated at a suitable temperature and pressure depending on the properties of the materials, to thereby obtain a large amount of excellent products within a short time, and thus the present device was created.

Namely, according to the present invention, oil of a predetermined temperature is fed into the pressurized fryer chamber of the present invention from an oil heater via a heating receiver tank, a starting material is placed therein, pressure heated for a predetermined time with the pressure generated from within the starting material and the pressure gas separately fed therein, and then is opened to the air. In the course of this process, the heating temperature and the pressure are controlled in accordance with the properties of the starting material, to improve the color, luster and quality of the product and provide uniform and excellent products within a short time; the used oil in the pressurized fryer chamber after removal of the products is returned to the heating receiver tank 28 through a filter device (oil filter), and the oil heated to a required temperature in an oil heater is fed to the heating fryer chamber, to perform a pressurized, heat cooking for a predetermined time. These steps are carried out continuously.

The device of the present invention, having the above constitution, enables a throw-in and, discharge of a starting material treated under atmospheric pressure, which is impossible in the continuous pressurized fryer device of the prior art as described above, and can effect an efficient oil frying at one time by a fryer program corresponding to the properties of the starting material, can perform a continual precise filtration of the frying oil after use, and can immediately feed sufficiently heated oil for the next step from the heating receiver tank to the pressurized fryer chamber, to give a product of an extremely good quality.

An embodiment of the pressurized fryer device of the present invention is described with reference to the drawings, but the present invention is by no means limited thereto.

Numeral 1 denotes the pressure fryer chamber of the present invention, wherein an inlet 1' for the material to be treated is provided at the upper side portion thereof, and an oil inlet 1" at a suitable side position thereof.

At the above inlet 1' for the starting material to be treated, a vessel (basket) T for the material to be treated is mounted on the frame body F provided internally, and the chamber is closed and made air-tight after an insertion and removal of the vessel T. At the upper part of the pressure fryer is provided an introducing inlet 3 for an inert gas (e.g., nitrogen ($N_2$) gas) or steam or air for pressurization, and is provided with a gas introducing control valve 3'. Also, above the chamber are provided an automatic pressure control valve 4, a vent valve 5 and a safety valve 6. Numeral 7 is a pressure sensor. Within the pressurized fryer chamber are provided an oil heater 13 and an oil temperature sensor 12. Also, a quantitating level sensor 8 is provided, at the upper part of the fryer chamber and a lower level sensor 9 is provided at the lower part, whereby an automatic control of the oil temperature and oil amount is effected. Also, the pressurized fryer chamber 1 has an oil discharging outlet 2 at the lower part thereof, from which used oil is delivered by an oil discharging pump 14 to an oil-water separator 15.

An oil cooler 10 is provided at the side of the pressurized fryer chamber, for a control of the oil temperature within the pressurized fryer chamber; 11 is an oil circulation pump.

An oil filter chamber 16, is mounted at the lower part of the oil-water separator, and is provided with a spanned filter paper 19. This filter paper 19 is wound from the filter paper feeding roll 17 onto the filter paper wind-up roll 18, to thereby enhance the filtration efficiency.

Subsequently, the oil cleaned in the oil filter chamber is selectively introduced into the heating receiver tank 24 or 28.

Heated oil receiving tanks 24 and 28 are set on both sides of the oil heater 32, to distribute the oil heated by the oil heater 32, and in the respective tanks 24 or 28 are provided temperature sensors 27, 31, and upper limit sensors 25, 29 and lower limit sensors 26, 30 of oil amounts, which are adjusted to control the oil temperature and the oil amount adapted to the fryer program corresponding to the starting material to be treated. Although the program preparation mechanism is not shown, a conventional automatic control mechanism (program control) may be applied.

The oil heater 32, and the heating receiver tanks 24, 28 are suitably partitioned, and oil therein circulated by the oil circulation pump 33 to thereby feed sufficient heated fryer oil.

Figure 2:
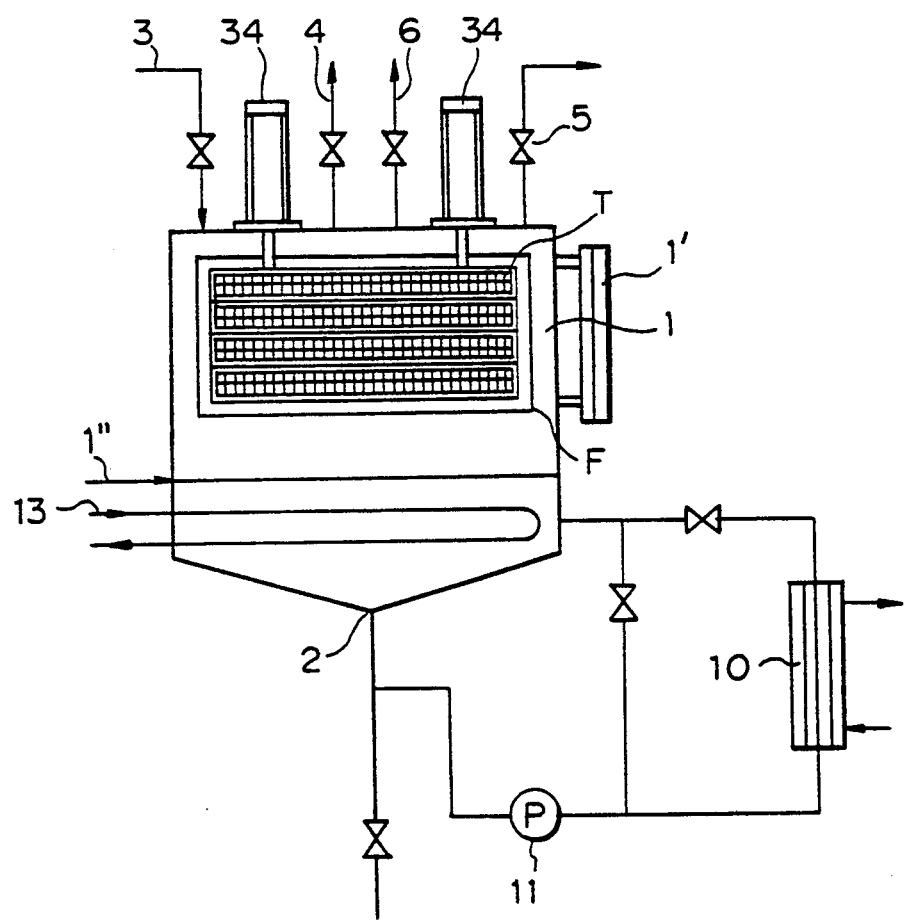
FIG. 2 is an enlarged side view of the pressurized fryer chamber of the present invention.
Figure 3A:
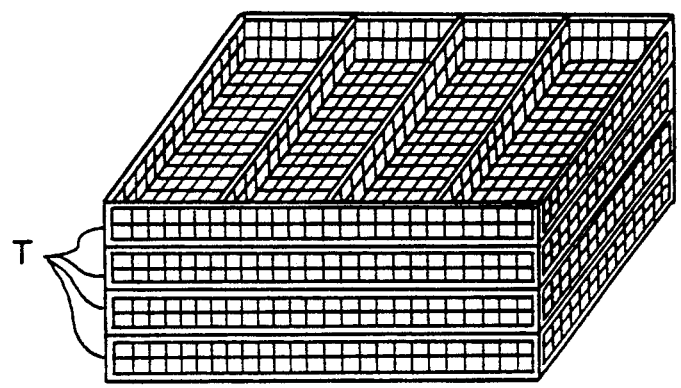
FIG. 3A is a perspective view of piled-up baskets housing the material to be treated, as used in the present invention.
Figure 3B:
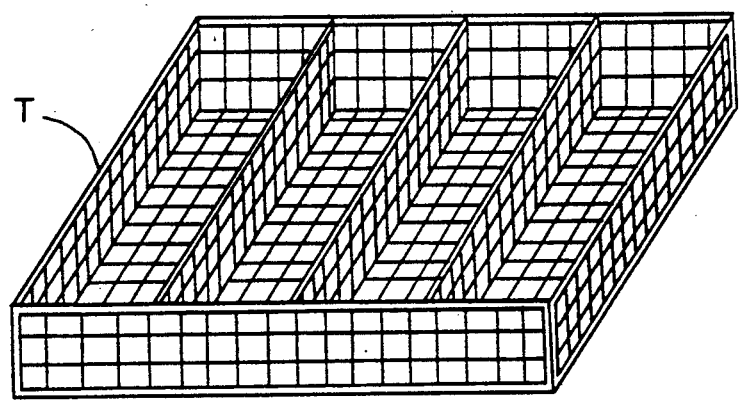
FIG. 3B is a simple perspective view thereof.

Next, the insertion of the material to be treated into the pressurized fryer device, as seen from FIG. 2 and FIGS. 3A and 3B, within the pressurized fryer chamber 1, is described. The frame body F housing the treated product containing basket T therein is dipped into the oil by vertical freely movable cylinders 34, 34, and in the frame several stages are piled up, while the baskets are partitioned so as to contain the appropriate amounts as shown in FIGS. 3A and 3B. These baskets are mounted within the frame from the side of the pressurized fryer chamber, to maintain an air tight seal in the same chamber.

Figure 4:
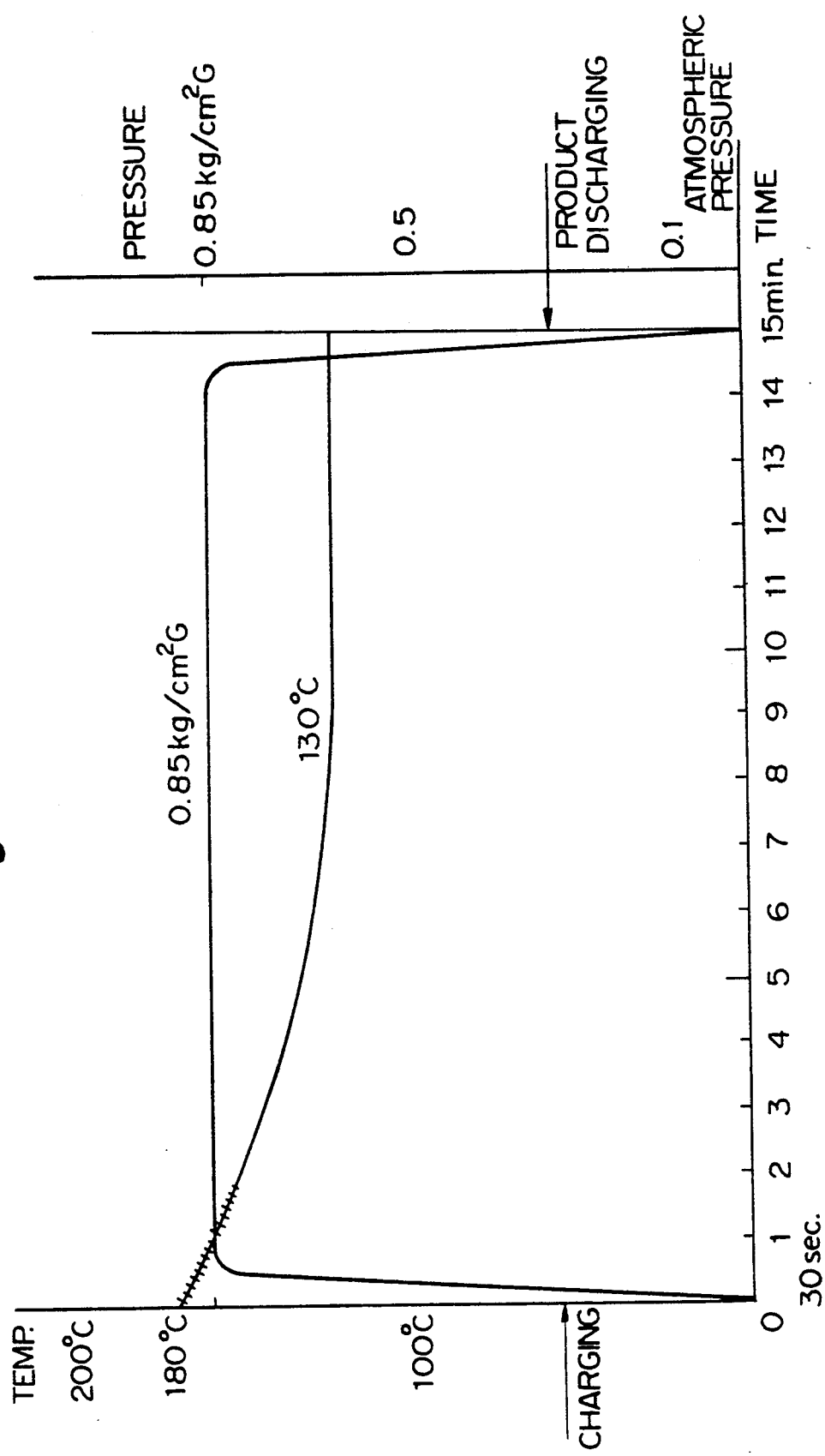
FIG. 4 is an example of a fryer program used for practicing the present invention.

Next, an outline of a use example of the pressurized fryer device of the present invention is described. First, into the pressurized fryer device 1 is introduced an appropriate amount of oil heated to an oil temperature of 200° C. to 180° C., according to the fryer program shown in FIG. 4, through the oil heater 32 and the heating receiver tank 24 or 28. Chicken meat with bone is introduced as the material to be treated in suitable sizes (e.g., one set of dissociated wings, body, legs with bone, etc.) arranged in the basket as shown in FIGS. 3A and 3B and housed under the treated product-containing frame in the pressurized fryer chamber through the treated product inlet 1' in FIG. 1, FIG. 2, followed by hermetically sealing the lid body. Then, the frying is started for an initial 2 minutes, under the conditions set at 180° C. to 170° C. and a chamber pressure of 0.85 kg/cm²G, and the frying is completed with a good coloration during this period. Thereafter, the conditions are maintained at 130° to 150° C. for about 7 to 10 minutes. After a total time of 15 minutes, the inner pressure is released, and the fried products are taken out of the oil under atmospheric pressure, drained of oil, and removed from the chamber. During this period, the oil temperature and the chamber pressure are controlled through the oil heater 32, the heating receiver tanks 24, 28, or by a suitable automatic operation of the cooler 10.

After this step is repeated several times, the used oil is discharged each time by opening the oil discharging outlet at the lower part of the fryer chamber 1, and transferred by the oil discharging pump 14 to the oil-water separator 15, and the contaminated oil is permitted to flow down onto the filter paper 19 in the oil filter chamber 16 provided therebelow. The oil filtered through the filter paper is transferred selectively by the oil discharging pump 20 to the oil receiver tanks 24 or 28, to be heated by the oil heater 32 again. The shortage of the oil is supplemented from the oil supplementing tank 21 at any desired time, in an appropriate amount. Numerals 22 and 23 denote oil supplementing tank upper and lower limit sensors, respectively.

Subsequently, following the fryer program, oil at a suitable temperature is delivered to the pressurized fryer chamber 1 and is fed to the pressurized fryer to be treated (chicken meat with bone, etc.).

Figure 5:
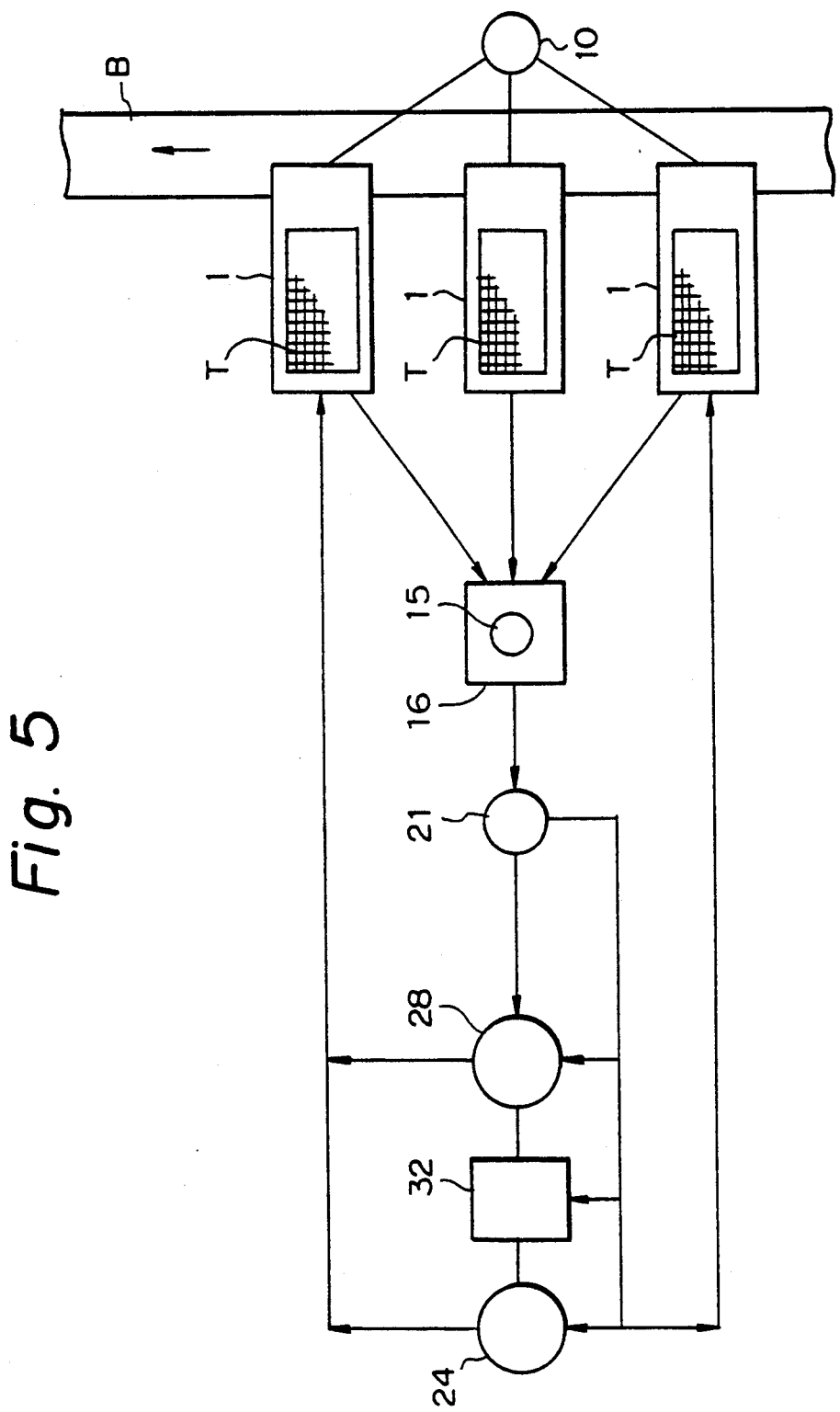
FIG. 5 is a flow chart of claim 2 of the present invention.

The invention according to claim 2 of the present invention, as shown in FIG. 5, has rows of pressurized fryer chambers 1 arranged in parallel, and a belt conveyor B is provided at the treated material inlet (which is also the outlet), through which the starting material is taken in and taken out, and the heated oil is fed to several chambers through the heating receiver tanks 24, 28 and the oil heater 32, and the subsequent oil treatment is carried out according to the batch continuous system, via the oil-water separator 15, the oil filter chamber 16, the heating receiver tanks 24, 28, the oil heater 32, and circulated to the pressurized fryer chamber 1 whereby the efficiency of the present invention can be increased. Numeral 27 is a temperature sensor.

In the following, the following preparation example is described as a specific Example of the present invention,.

PREPARATION EXAMPLE 1

Chicken meat with bone (sizes, about 130 mm × 140 mm × 40 mm, 170 mm × 80 mm × 40 mm, 40 mm × 80 mm × 40 mm) was coated with frying powder, appropriately pre-treated, juxtapositioned on a tray, introduced into a pressurized fryer, and the frying was initiated at an oil temperature of 180° C. After 30 seconds, $N_2$ gas was introduced, so that the inner pressure in the fryer became 0.85 kg/cm²G, for a pressure control, while the oil temperature was controlled to 130° C. for about 5 to 8 minutes, from 180° C., and 30 seconds before completion of the frying time (15 minutes), the inner pressure was released and the fried product taken out from the oil under atmospheric pressure, followed by draining the oil.

The above operational conditions are summarized in the following Table.

TABLE 1

| Oil temperature | Pressure | Time |
| --- | --- | --- |
| 180° C. | 0.85 kg/cm²G | 15 min. |

Figure 6:
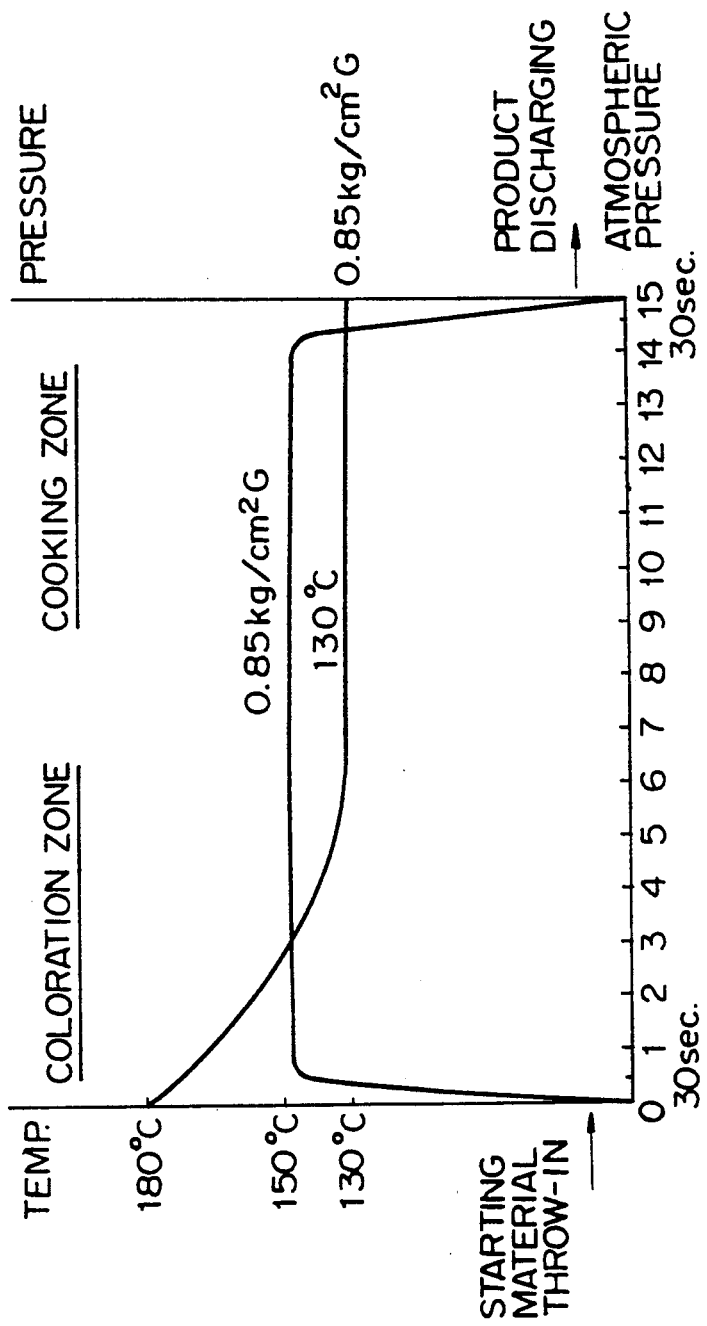
FIG. 6 is a graph showing the correlation of temperature, pressure, charging and discharging in the Preparation Example 1.

The correlation graph of temperature, pressure, charging, and discharging is shown in FIG. 6.

Under atmospheric pressure, the starting material was placed into an oil at 180° C., and after 30 sec, by controlling the pressure to 0.85 kg/cm²G, the coloration zone of the frying powder was created at around 180° C. to 150° C., and the cooking zone at around 150°

C. to 130° C., and further, by an internal pressurization of the fryer, the water content in the product was controlled to provide a good yield as well as a good bone release, whereby a juicy product was obtained. As described above, the following specific features were obtained from the present invention.

1. A good coloration of the product, and the flavor of frying powder exhibited.
2. A good yield (about 85 to 95%).
3. A good bone release.
4. A juicy meat quality.

Also, from the above Preparation Example, for the frying of meat, it has been clarified that fried meat such as beef and pork, etc. (having specific features) can be prepared by varying the relationships of temperature, pressure, time, placement of the starting material, and discharging of the product, etc.

PREPARATION EXAMPLE 2

Sliced swellfish meat with bone (about 30 mm×40 mm×30 mm square) was pre-treated by coating with Yoshino arrowroot starch or potato starch, and introduced into the pressurized fryer as in Preparation Example 1. The frying was initiated at an oil temperature of 160° C., and 30 seconds later, $N_2$ gas was introduced to control the pressure so that the internal pressure in the fryer became 0.55 kg/cm$^2$G, and the oil temperature was controlled and maintained at 120° C. after about 2 minutes, from 160° C. The fryer internal pressure was released 30 seconds before completion of the frying time (5 minutes), and the fried product was taken out under atmospheric pressure, followed by draining the oil.

The above operational conditions are summarized in Table 2.

TABLE 2

| Oil temerature | Pressure | Time |
|---|---|---|
| 160° C. | 0.55 kg/cm$^2$G | 5 min. |

Figure 7:
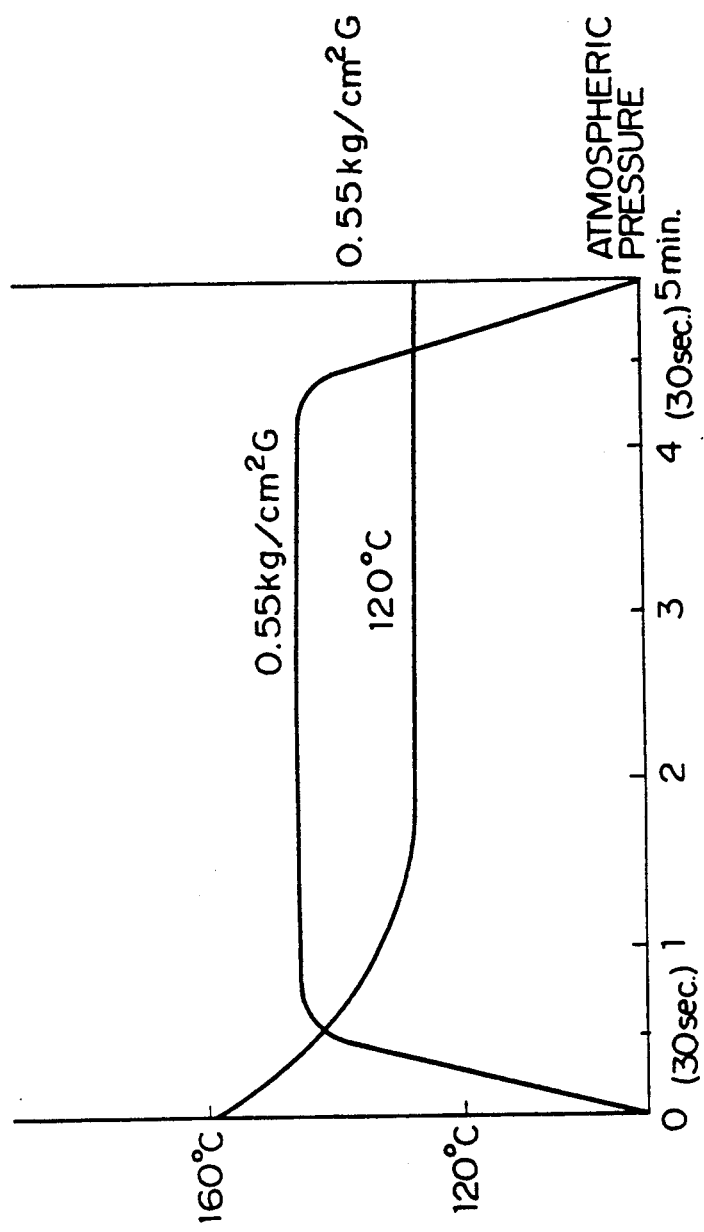
FIG. 7 is a graph showing the correlation of temperature, pressure, charging and discharging.

The correlation graph of temperature, pressure, charging, and discharging is shown in FIG. 7.

As a result, for the same reasons as in Preparation Example 1, the same results and specific features were obtained.

1. A good color finish of the product.
2. A good yield (about 85 to 95%).
3. A good bone release.
4. A juicy meat quality.
5. Frying steps were freely controlled automatically according to the fryer program, whereby good homogeneous products were prepared in large quantities.

As described in detail above, according to the constitution of the present invention, the pressurized fryer device of the present invention has the following effects.

(1) Compared with the previous invention by the present inventors, disclosed in Japanese Patent No. 999431 (Japanese Patent Publication (Kokoku) No. 54-25109), it is possible to place starting materials into oil and discharge same under atmospheric pressure.

(2) The pressurized fryer can be prepared continuously, following the fryer program corresponding to the starting material to be treated.

(3) Excellent and homogeneous products can be prepared easily and in large quantities.

(4) The frying oil can be precisely filtered each time, and thus it is possible to automatically neutralize same.

I claim:

1. A pressurized fryer device comprising:
a pressurizable fryer chamber for reception therein of frying oil to be used in frying a product;
means for inserting a product within said fryer chamber, for holding a product placed therein, for dipping the product into and out of the drying oil, and for removing a fried product from said fryer chamber;
means for pressurizing said fryer chamber with a pressurized gas to above atmospheric pressure;
means for continuously providing pre-heated oil to the pressurized fryer chamber;
means for continuously controlling the amount and temperature of oil in said pressurized fryer chamber;
means for continuously withdrawing oil admixed with water from the pressurized fryer chamber;
means for continuously separating oil and water withdrawn from the pressurized fryer chamber;
filter means for continuously filtering solid particles entrained in the separated oil withdrawn from the pressurized fryer chamber, said filter means comprising an elongated filter paper and means for continuously passing the filter paper under a stream of particle-laden oil to be filtered;
a fresh oil supply source;
at least two oil receiving tanks for receiving oil from said filter means and from said fresh oil supply source;
heater means external to the fryer chamber for heating oil to be supplied thereto from said oil-receiving tanks;
means for maintaining the amount and temperature of oil in said oil-receiving tank at a predetermined level;
heater means disposed inside said fryer chamber and cooling means disposed outside said fryer chamber for controlling the temperature of oil in the pressurized fryer chamber to predetermined level;
means for lowering the pressure in said fryer chamber when frying of the product is completed; and
conveyor means for transporting the fried product removed from the depressurized fryer chamber.

* * * * *